United States Patent
Gulledge

(10) Patent No.: US 9,942,217 B2
(45) Date of Patent: Apr. 10, 2018

(54) SYSTEM AND METHOD FOR GENERATING A SERVICE PROVIDER BASED SECURE TOKEN

(71) Applicant: AT&T INTELLECTUAL PROPERTY I, L.P., Atlanta, GA (US)

(72) Inventor: Michael Gulledge, Wentzville, MO (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 41 days.

(21) Appl. No.: 14/729,581

(22) Filed: Jun. 3, 2015

(65) Prior Publication Data

US 2016/0359829 A1    Dec. 8, 2016

(51) Int. Cl.
*G06F 7/04* (2006.01)
*H04L 29/06* (2006.01)

(52) U.S. Cl.
CPC .............................. *H04L 63/0807* (2013.01)

(58) Field of Classification Search
CPC .... H04L 63/08; H04L 63/123; H04L 63/0807
See application file for complete search history.

(56) References Cited

U.S. PATENT DOCUMENTS

| | | | |
|---|---|---|---|
| 7,113,930 B2 | 9/2006 | Eccles et al. | |
| 7,983,994 B2 | 7/2011 | Hurry | |
| 8,559,639 B2 | 10/2013 | Hird | |
| 8,630,954 B2 | 1/2014 | Thaw | |
| 8,639,619 B1 | 1/2014 | Priebatsch | |
| 8,688,859 B2 | 4/2014 | Cronic et al. | |
| 8,788,429 B2 | 7/2014 | Tieken | |
| 8,893,250 B2 | 11/2014 | Mattsson et al. | |
| 8,914,635 B2 | 12/2014 | Parrish | |
| 2007/0226785 A1* | 9/2007 | Chow | H04L 63/08 726/8 |
| 2008/0015987 A1* | 1/2008 | Ramavarjula | G06Q 20/10 705/44 |

(Continued)

OTHER PUBLICATIONS

Wei-Bin Lee et al., "A New Delegation-Based Authentication Protocol for Use in Portable Communication Systems," IEEE Transactions on Wireless Communications, vol. 4, No. 1, Jan. 2005, pp. 57-64.*

(Continued)

*Primary Examiner* — Luu Pham
*Assistant Examiner* — Canh Le
(74) *Attorney, Agent, or Firm* — Greenblum & Bernstein, P.L.C.

(57) ABSTRACT

Devices, systems, and methods for generating a secure token specific to an online service provider are provided. User account information of a user is transmitted to a token processor from an online service provider requesting a secure token generation. The token processor also receives exchange information for an exchange between the user and the online service provider. The token processor generates, based on the exchange information and the user account information, a secure token to be used for the exchange. The generated secure token is mapped to the online service provider and transmitted to the online service provider. The stored secure token is usable only at the mapped online service provider.

13 Claims, 10 Drawing Sheets

(56) References Cited

U.S. PATENT DOCUMENTS

| | | | |
|---|---|---|---|
| 2008/0134295 A1* | 6/2008 | Bailey | G06F 21/41 726/4 |
| 2008/0223918 A1 | 9/2008 | Williams et al. | |
| 2009/0055907 A1* | 2/2009 | Van Horn | H04L 9/32 726/6 |
| 2009/0254483 A1 | 10/2009 | Barkan | |
| 2009/0300738 A1 | 12/2009 | Dewe et al. | |
| 2010/0131764 A1 | 5/2010 | Goh | |
| 2012/0028609 A1 | 2/2012 | Hruska | |
| 2012/0143772 A1 | 7/2012 | Abadir | |
| 2012/0173431 A1 | 7/2012 | Ritchie et al. | |
| 2012/0191615 A1 | 7/2012 | Schibuk | |
| 2013/0031006 A1* | 1/2013 | McCullagh | G06Q 20/363 705/66 |
| 2013/0332344 A1 | 12/2013 | Weber | |
| 2014/0012412 A1 | 1/2014 | Khonalkar et al. | |
| 2014/0040148 A1 | 2/2014 | Ozvat et al. | |
| 2014/0143146 A1* | 5/2014 | Passanha | G06Q 20/40 705/44 |
| 2014/0165170 A1* | 6/2014 | Dmitriev | H04L 63/08 726/7 |
| 2014/0195425 A1 | 7/2014 | Campos et al. | |
| 2014/0281523 A1 | 9/2014 | Golino | |
| 2014/0372308 A1 | 12/2014 | Sheets | |
| 2014/0380445 A1 | 12/2014 | Tunnell et al. | |
| 2015/0120544 A1* | 4/2015 | Marji | G06Q 20/4016 705/44 |
| 2015/0269545 A1* | 9/2015 | Epler | G06Q 20/10 705/42 |

OTHER PUBLICATIONS

Daniel A. Menasce et al., " QoS management in service-oriented architectures," Performance Evaluation an International Journal, Nov. 17, 2006, pp. 646-663.*

Axon et al., "Understanding and Selecting a Tokenization Solution", Securosis, Jul. 1, 2010, pp. 1-33.

* cited by examiner

Computer

SYSTEM AND METHOD FOR GENERATING A SERVICE PROVIDER BASED SECURE TOKEN

BACKGROUND

1. Field of the Disclosure

The present disclosure relates to the field of secure exchanges. More particularly, the present disclosure relates to an online service provider (OSP) specific secure token.

2. Background Information

In a typical online transaction, a user enters a credit card number and a secure code on an eCommerce site in plain text to initiate payment. The eCommerce site transmits the received payment information to a financial processing network in order to debit money from a user's account, and credit the money to an account corresponding to the eCommerce site. Some eCommerce sites, such as Amazon.com®, store the received payment information for future processing to make a seamless payment experience so the user does not have to enter the credit card information every time a purchase is made.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
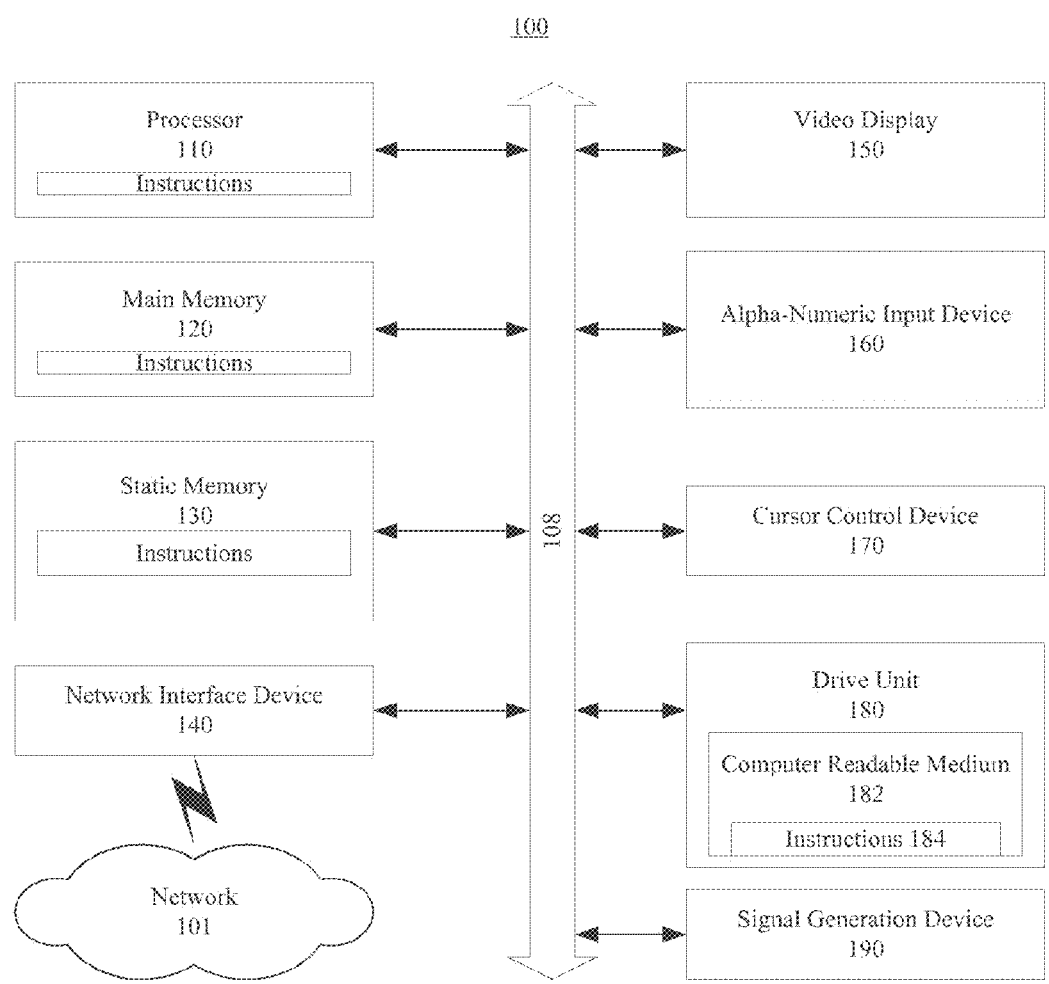
FIG. 1 shows an exemplary general computer system that includes a set of instructions for generating a secure token specific to an online service provider.

FIG. 1 is an illustrative embodiment of a general computer system, on which a method of generating a service provider based secure token can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a communications device, a control system, a web appliance, a network router, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
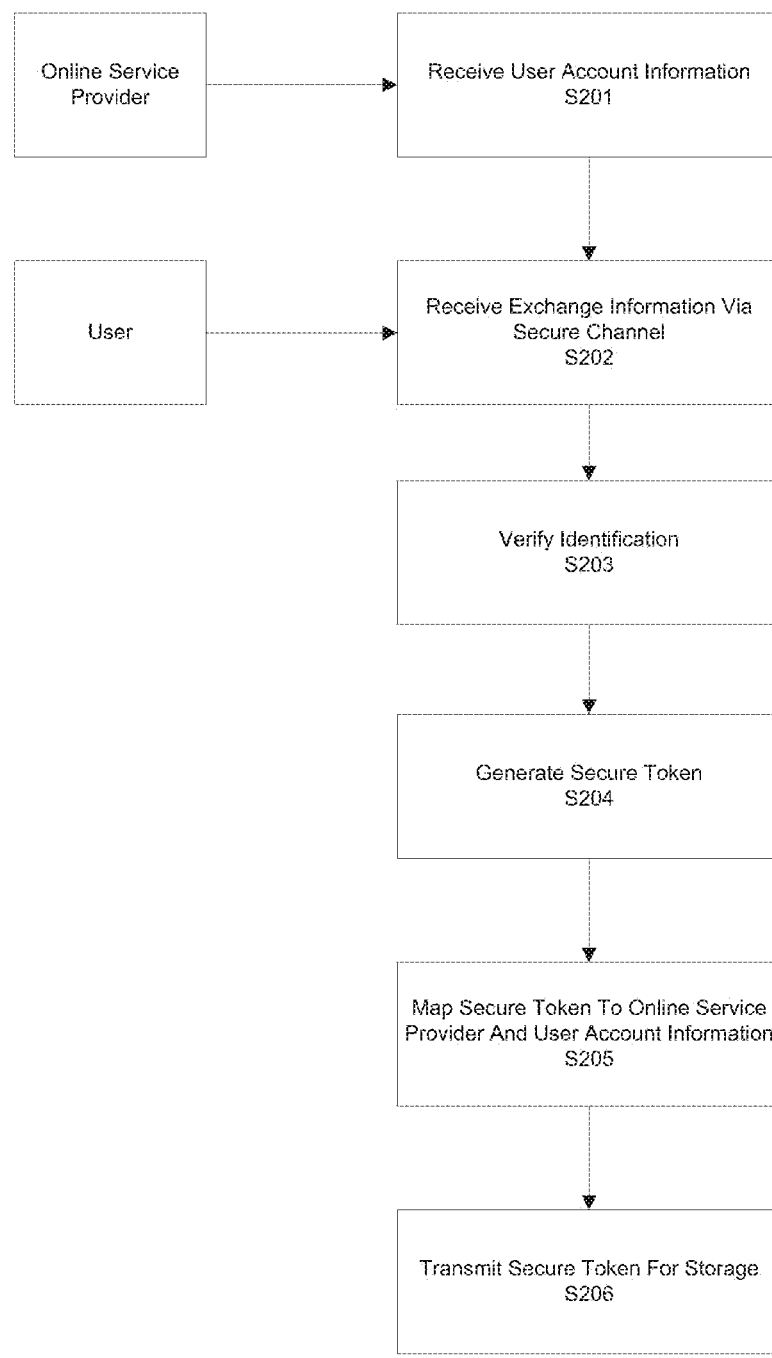
FIG. 2 shows an exemplary method for generating a secure token specific to an online service provider, according to an aspect of the present disclosure.

FIG. 2 is an illustrated embodiment of a method for generating a secure token specific to an online service provider, according to an aspect of the present disclosure. The method of FIG. 2 is described with respect to a third party processor. In FIG. 2, user account information of a user registered with an online service provider is received at the third party processor at S201. The user account information is provided by the online service provider requesting a secure token generation corresponding to the user account information.

User account information may include, without limitation, biographical information (e.g., name, birthdate, social security number, etc.), address information, user preferences, interests, password, and the like. Online service provider may include, without limitation, an eCommerce site, e-finance site, e-health site, e-government site, mobile service provider, internet service provider, email provider, entertainment provider, and the like.

The user account information may be received by the third party processor, which may process, for example, exchanges and/or requests for generation of an online service provider specific token. Reference to exchanges, as used herein, may include, without limitation, redemption of membership points, discounts, a game, a game item, a virtual item, a physical item, or real/virtual currency in exchange for token information. The third party processor may include a membership management server, a game server, a social media server, an information management server, a credit card processing institution, a banking institution, and the like.

At S202, exchange information corresponding to the user account information is received at the third party processor. The exchange information may be provided by a user, such that the exchange information bypasses the online service provider. Accordingly, the online service provider may not receive or access the transmitted exchange information, such that the online service provider remains unaware of the exchange information transmitted by the user. The exchange information may be provided by a secure channel, which may be established by the third party processor. In an example, the online service provider may direct the user to the third party processor to initiate establishment of the secure channel. The exchange information may include, without limitation, credit card information, checking account information, bitcoin account information, loyalty point information, membership information, gaming account information, security information, and the like.

At S203, identification of the user providing the exchange information is verified to ensure that the exchange information belongs to the user. Further, verification to ensure that the exchange information corresponds to the received user account information may be performed. Once the user, the user account information, and/or the exchange information have been verified, a secure token is generated at S204. The secure token may be generated by the third party processor.

In an example, the secure token may be in a form of a unique identifier including, for example, a combination of alphanumeric values, a combination of just numbers, a combination of just letters, or a combination of letters, numbers, and special characters. The secure token information may be randomly generated or preconfigured. Further, the secure token information may reset itself based on number of uses, time, or in response to a request by a user, online service provider, or third party processor.

The secure token may include information associated with the online service provider. The secure token may be reusable, such that the same secure token may be used to perform separate exchanges at different times. The secure token may have an expiration date. Also, the secure token may be configured to have preconfigured limits, such as a certain total amount of purchases or number of exchanges that may be made within a given period, before requiring validation of user information and/or exchange information. The preconfigured limits may be specified by the user, the online service provider, or the third party processor.

At S205, the secure token is mapped to the requesting online service provider. Further, the secure token is mapped to the user account information. Once the secure token is mapped to the online service provider, the secure token may be used only at the mapped online service provider. The secure token may be mapped to only one online service provider to have a one-to-one relationship. However, aspects of the disclosure are not limited thereto, such that the secure token may be mapped to multiple online service providers having certain relationships (e.g., commonly owned companies, sister companies, and affiliates).

At S206, the mapped secure token is transmitted to the requesting online service provider for storage. The online service provider may store the secure token in its database, a centralized shared database, or at a contracting vendor database (e.g., cloud storage). Accordingly, the requesting online service provider may store or have access to the user information and related secure token information, but not the exchange information associated with the user account information, thereby enhancing security for both the user and the online service provider in case of a security breach at a user device or at the online service provider.

Figure 3:
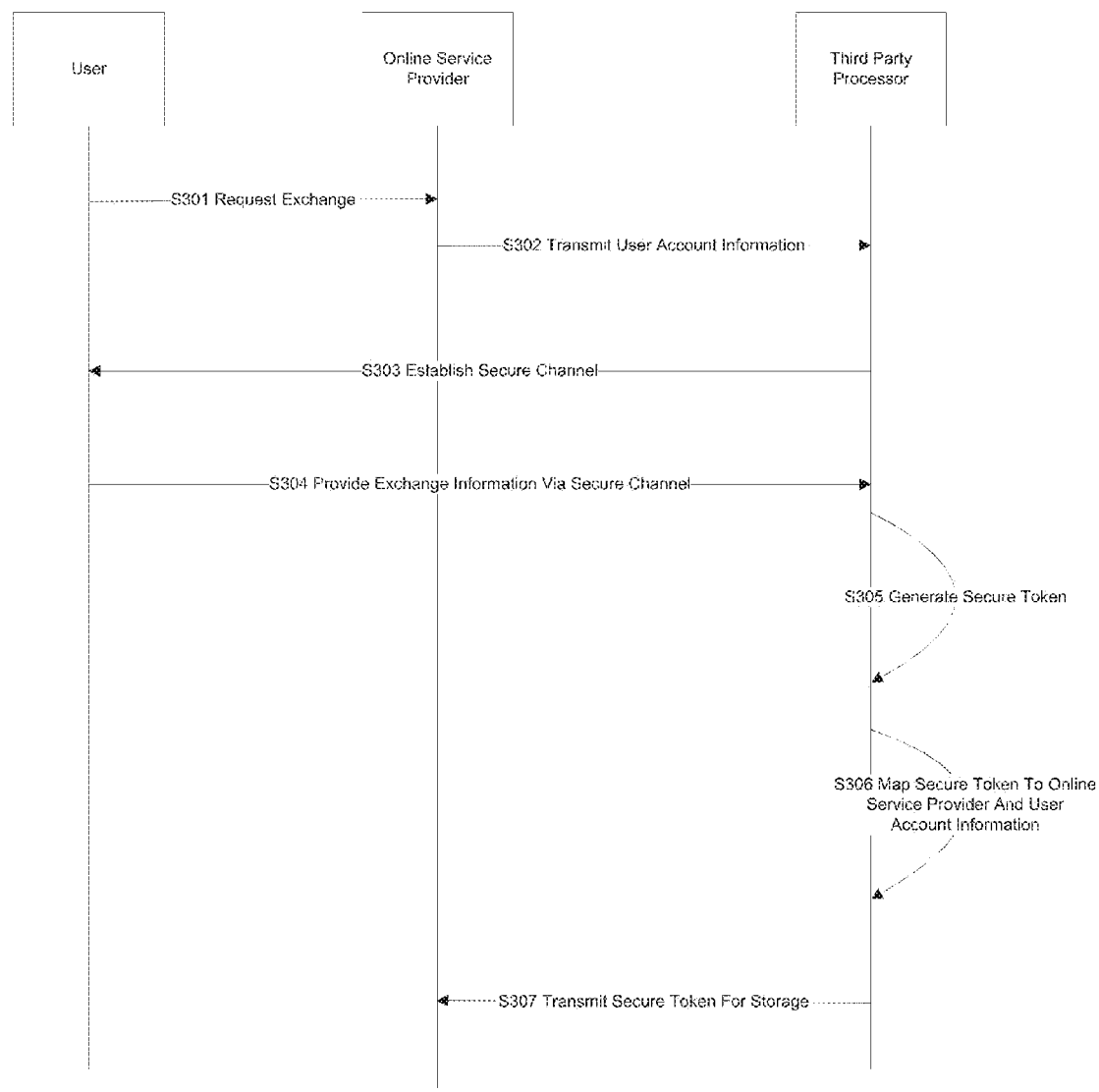
FIG. 3 shows an exemplary relationship of various parties for generating a secure token specific to an online service provider, according to an aspect of the present disclosure.

FIG. 3 shows an exemplary relationship of various parties for generating a secure token specific to an online service provider, according to an aspect of the present disclosure. At S301, a user may request to conduct an exchange or storage of exchange information at an online service provider. At S302, the online service provider transmits user account information to a third party processor. The online service provider may also request generation of a secure token corresponding to the user account information. In addition, the online service provider may also direct the user to the third party processor for providing the exchange information. At S303, the third party processor establishes a secure channel for receiving the exchange information. At S304, the user provides the exchange information via the secure channel.

At S305, the third party processor generates a secure token based on the received user account information and the exchange information. At S306, the third party processor maps the secure token to the requesting online service provider. Further, the third party processor maps the secure token to the user account information. Once the secure token is mapped to the online service provider, the secure token may be used only at the mapped online service provider. The secure token may be mapped to only one online service provider to have a one-to-one relationship. However, aspects of the disclosure are not limited thereto, such that the secure token may be mapped to multiple online service providers having certain relationships (e.g., common owned companies, sister companies, and affiliates).

At S307, the third party processor transmits the secure token to the online service provider for storage. The online service provider may store the secure token in its database, a centralized shared database, or at a contracting vendor database (e.g., cloud storage). Accordingly, the requesting online service provider may store or have access to the user information and related secure token information, but not the exchange information associated with the user account information, providing additional security for both the user and the online service provider.

Figure 4:
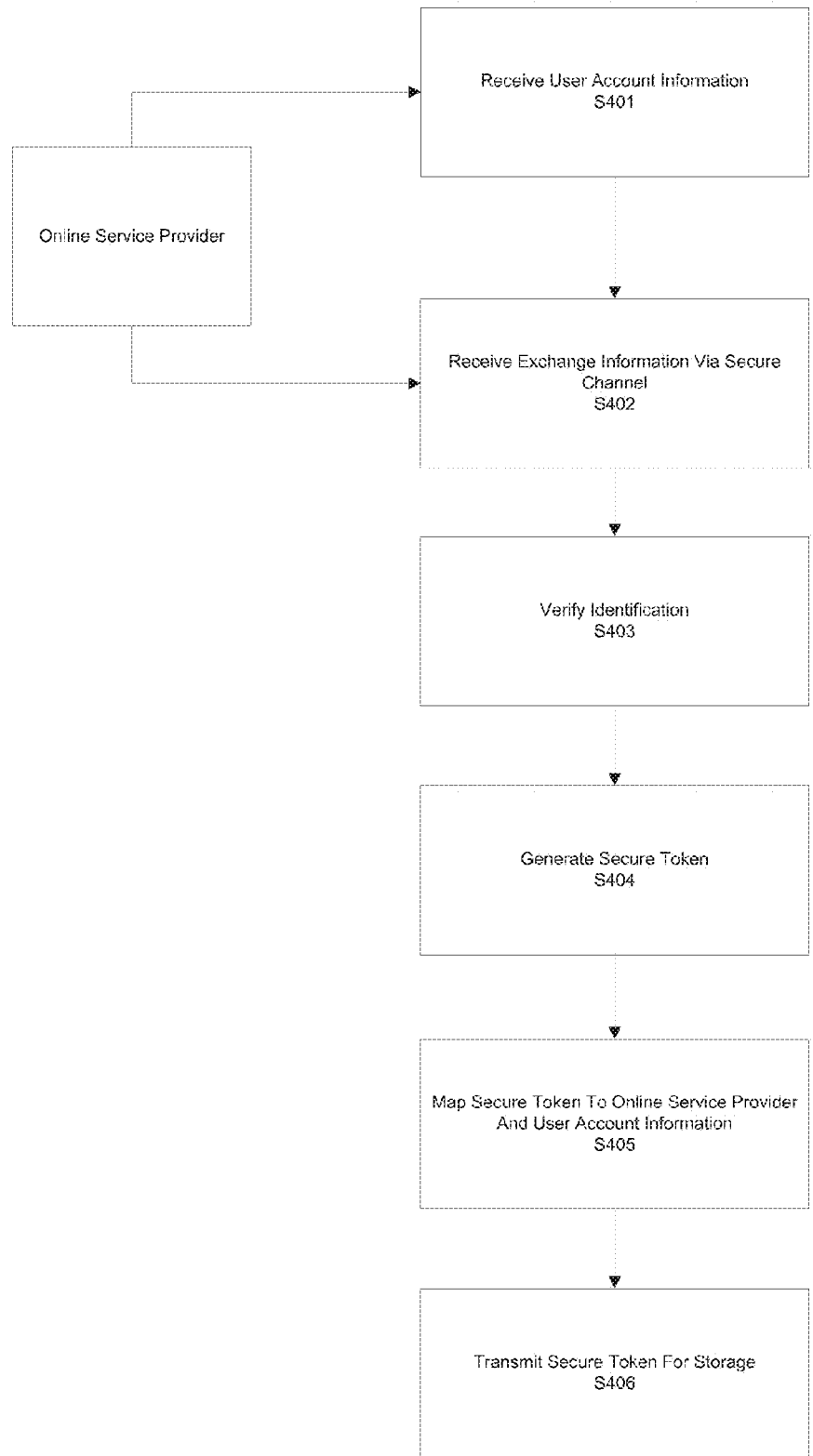
FIG. 4 shows an exemplary method for generating a secure token specific to an online service provider, according to an aspect of the present disclosure.

FIG. 4 shows an exemplary method for generating a secure token specific to an online service provider, according to an aspect of the present disclosure. The method of FIG. 4 may be described with respect to a third party processor. At S401, user account information of a user registered with an online service provider is received at a third party processor, such as a token processor. The user account information is provided by the online service provider requesting a secure token generation.

The user account information may be received by the third party processor which processes, for example, exchanges and/or requests for secure token generation. The third party processor may include a credit card processing institution, a banking institution, a membership management server, a game server, a social media server, an information management server, and the like.

At S402, exchange information corresponding to the user account information is received at the third party processor. The exchange information may be provided by the online service provider. Further, the exchange information may be provided by a secure channel. The exchange information may include, without limitation, credit card information, checking account information, bitcoin account information, loyalty point information, membership information, gaming account information, and the like.

At S403, the exchange information is verified with the user account information to ensure that the exchange information corresponds to the received user account information. However, aspects of the disclosure are not limited thereto, such that the exchange information may be verified against the user account information prior to transmission to the third party processor. Once the user account information and the exchange information have been verified, a secure token is generated at S404. The secure token may be generated by the third party processor.

At S405, the secure token is mapped to the requesting online service provider. Further, the secure token is mapped to the user account information. Once the secure token is mapped to the online service provider, the secure token may be used only at the mapped online service provider. The secure token may be mapped to only one online service provider to have a one-to-one relationship. However, aspects of the disclosure are not limited thereto, such that the secure token may be mapped to multiple online service providers having certain relationships (e.g., commonly owned companies, sister companies, and affiliates).

At S406, the mapped secure token is transmitted to the requesting online service provider for storage. The online service provider may store the secure token in its database, a centralized shared database, or at a contracting vendor database (e.g., cloud storage).

Figure 5:
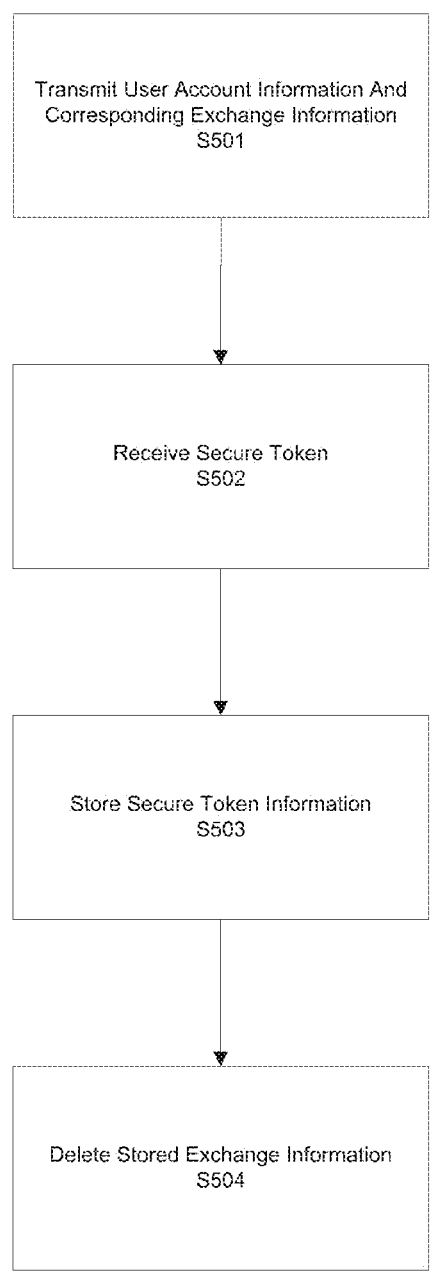
FIG. 5 shows an exemplary method for receiving a secure token specific to an online service provider, according to an aspect of the present disclosure.

FIG. 5 shows an exemplary method for receiving a secure token specific to an online service provider, according to an aspect of the present disclosure. The method of FIG. 5 may be described with respect to an online service provider. At S501, user account information stored at the online service provider is transmitted to a third party processor along with a request for a secure token generation. Exchange information corresponding to the user account information, which may be stored at the online service provider and transmitted along with the user account information. However, aspects of the disclosure are not limited thereto, such that the exchange information may be provided directly by a user or another vendor. In an example, the user account information may be transmitted separately from the exchange information or transmitted together. Further, the user account information and/or the corresponding exchange information may be transmitted after establishing a secure channel with the third party processor. The user account information and/or the corresponding exchange information may be transmitted via encryption or other secure transmission methods.

At S502, a secure token corresponding to the transmitted user account information and exchange information is received from the third party processor. In an example, the secure token may be mapped to the transmitted user account information and exchange information. Once the secure token is mapped to the online service provider, the secure token may be used only at the mapped online service provider. The secure token may be mapped to only one online service provider to have a one-to-one relationship. However, aspects of the disclosure are not limited thereto, such that the secure token may be mapped to multiple online service providers having certain relationships (e.g., common owned companies, sister companies, and affiliates).

At S503, the received secure token may be stored at the online service provider. In an example, the secure token may be stored at a database supporting or servicing the online service provider, such as its own database or a server in a cloud network. The stored secure token may be mapped to the user account information, such that the user may access the secure token for conducting an exchange without having to enter in exchange information.

At S504, once the secure token is stored and associated with the user account information at the online service provider, the exchange information associated with the user account information may be deleted. However, aspects of the disclosure are not limited thereto, such that the exchange information may be deleted once it has been transmitted to the third party processor. The exchange information may be stored and managed by the third party processor. Accordingly, the online service provider may no longer store or have access to the exchange information associated with the user account information.

Figure 6:
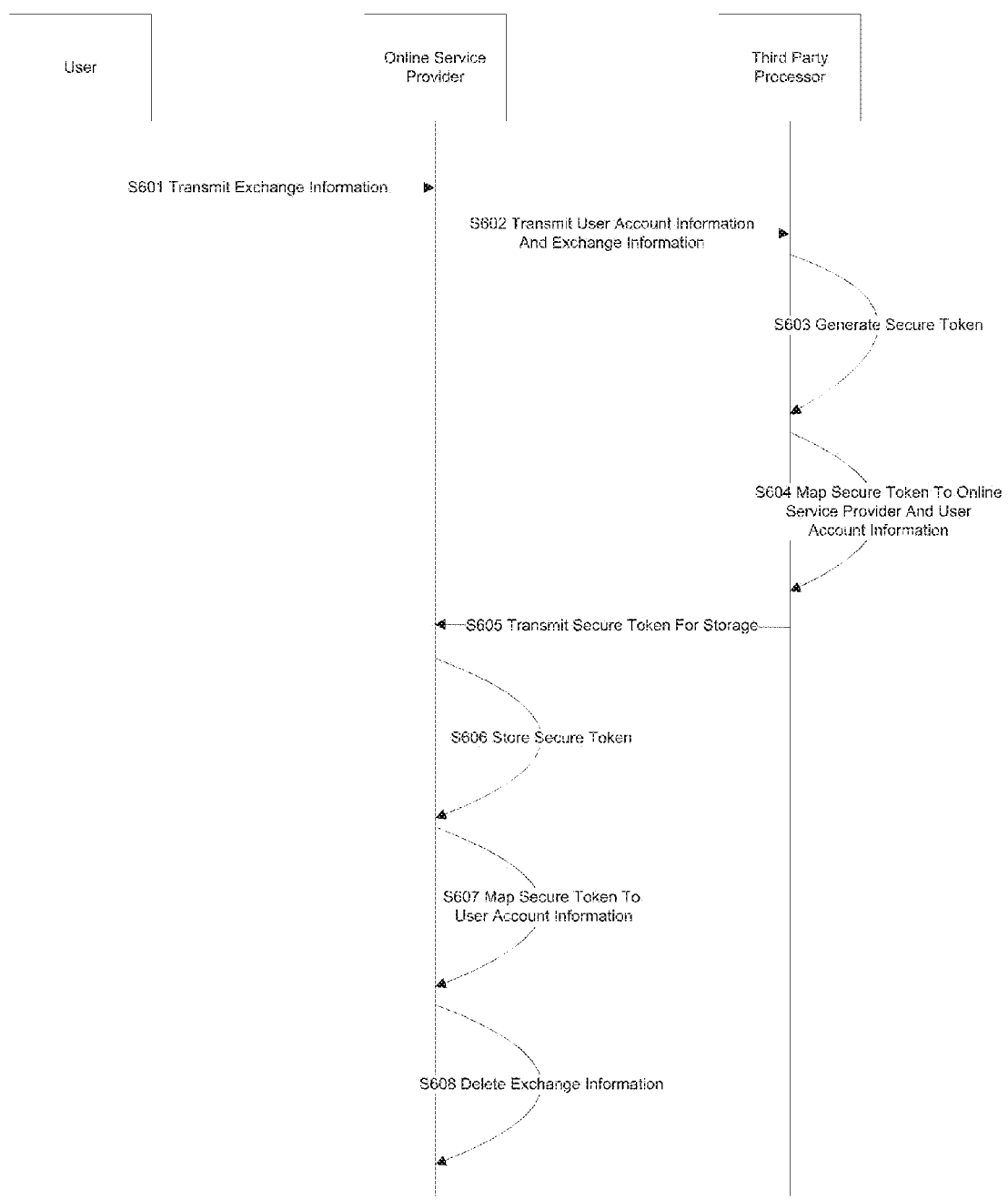
FIG. 6 shows an exemplary relationship of various parties for generating a secure token specific to an online service provider, according to an aspect of the present disclosure.

FIG. 6 shows an exemplary relationship of various parties for generating a secure token specific to an online service provider, according to an aspect of the present disclosure. At S601, a user may transmit exchange information to an online service provider. In an example, the user may be registered with the online service provider or checking out as a guest. At S602, the online service provider transmits user account information and the exchange information corresponding to the user or user account to a third party processor for generating a secure token.

At S603, the third party processor generates the secure token based on the received user account information and the exchange information. At S604, the third party processor maps the secure token to the requesting online service provider. Further, the third party processor maps the secure token to the user account information. Once the secure token is mapped to the online service provider, the secure token may be used only at the mapped online service provider. The secure token may be mapped to only one online service provider to have a one-to-one relationship. However, aspects of the disclosure are not limited thereto, such that the secure token may be mapped to multiple online service providers having certain relationships (e.g., common owned companies, sister companies, and affiliates). At S605, the third party processor transmits the secure token to the online service provider for storage.

At S606, the online service provider stores the received secure token. The online service provider may store the received secure token in its database or at a server in a cloud network. At S607, the online service provider maps the secure token to the user account information. At S608, the online service provider deletes the exchange information that was associated or mapped to the user account information.

Figure 7:
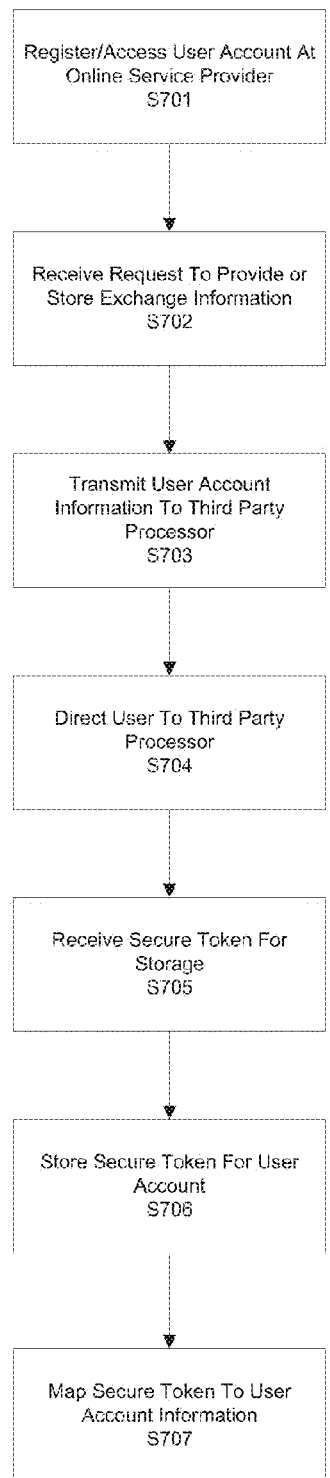
FIG. 7 shows an exemplary method for receiving a secure token specific to an online service provider, according to an aspect of the present disclosure.

FIG. 7 shows an exemplary method for receiving a secure token specific to an online service provider, according to an aspect of the present disclosure. The method of FIG. 7 may be described with respect to an online service provider. At S701, a user may register for or access user account at an online service provider. The user may access the user account the user has registered with the online service provider or access the online service provider as a guest. At S702, the online service provider receives a request to provide or store exchange information corresponding to user account information of the user. At S703, the online service provider transmits the user account information to a third party processor. Further, the online service provider may also notify the third party processor of the user's request to provide or store the exchange information. At S704, the online service provider may direct the user to the third party processor for providing or storing the exchange information. However, aspects of the disclosure are not limited thereto, such that the third party processor may contact the user directly to obtain the exchange information from the user.

At S705, the online service provider receives a secure token corresponding to the transmitted user account information for storage. At S706, the online service provider stores the received secure token. The online service provider may store the received secure token in its database or at a vendor network or server, such as a server in a cloud network. At S707, the online service provider maps the secure token to the user account information.

Figure 8:
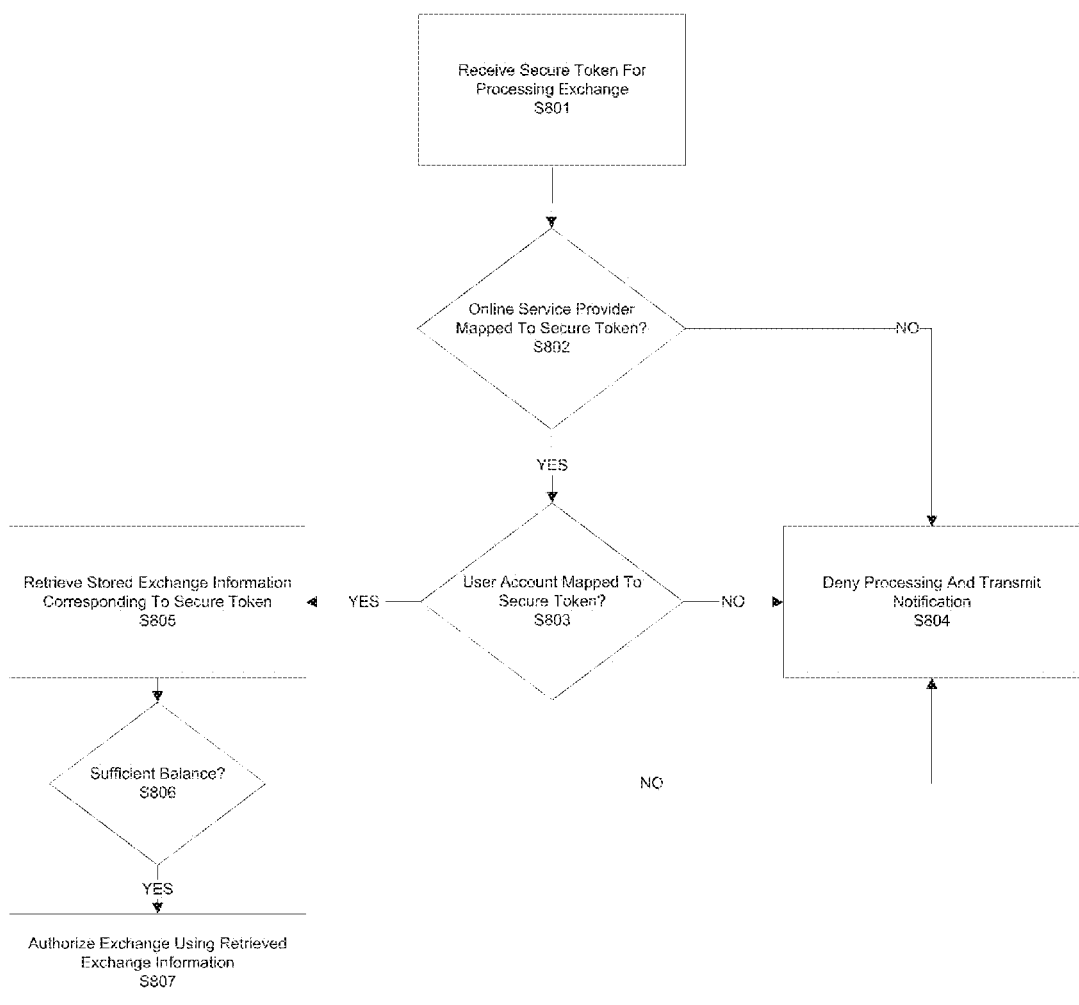
FIG. 8 shows an exemplary method for using a secure token specific to an online service provider, according to an aspect of the present disclosure.

FIG. 8 shows an exemplary method for using a secure token specific to an online service provider, according to an aspect of the present disclosure. The method of FIG. 8 may be described with respect to a third party processor. At S801, a third party processor receives a secure token for processing an exchange at a requesting online service provider. More specifically, a request for processing the exchange may be made by a user account at the requesting online service provider. At S802, a determination of whether the requesting online service provider is mapped to the secure token is made.

If the secure token is determined to be mapped to the requesting online service provider, a determination of whether the secure token is mapped to the user account requesting the exchange is performed at S803.

If the secure token is determined not to be mapped to the requesting online service provider, exchange processing is denied and a notification of the denied processing is transmitted at S804. The notification may be transmitted to one or more of the requesting online service provider, user, or a security vendor.

If it is determined that the secure token is mapped to the user account at S803, stored exchange information corresponding to the secure token is retrieved. The exchange information may be stored in a database of the third party processor or at a vendor network, such as a server in a cloud network.

At S806, a determination of whether sufficient balance is available for the retrieved exchange information is made. For example, sufficiency of points, currency, level, credit and the like to process the requested exchange may be determined.

If there is insufficient balance available, processing is denied and notification of the denied processing is transmitted at S804. The notification may be transmitted to one or more of the requesting online service provider, user, or security vendors.

If it is determined that there is sufficient balance available, the requested exchange is authorized and processed using the retrieved exchange information at S807.

Figure 9:
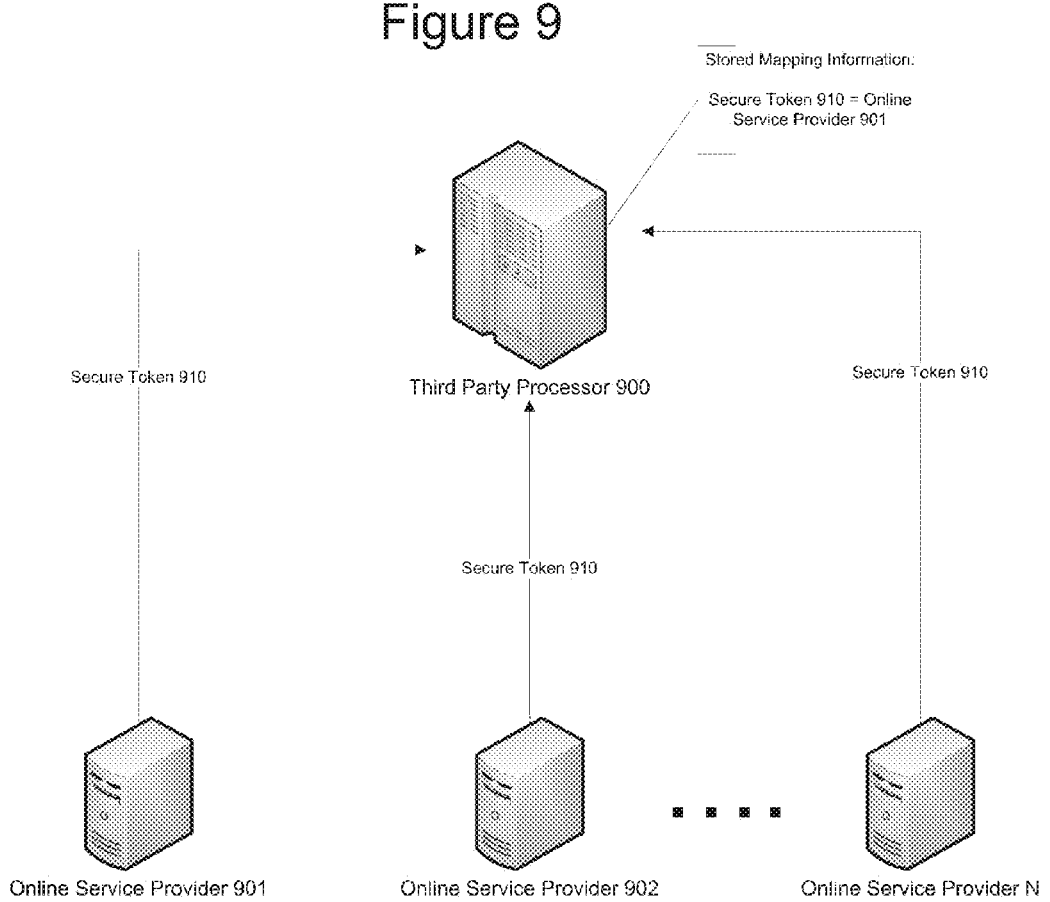
FIG. 9 shows an exemplary system to facilitate an exchange using a secure token specific to an online service provider, according to an aspect of the present disclosure.

FIG. 9 shows an exemplary system to facilitate an exchange using a secure token specific to an online service provider, according to an aspect of the present disclosure. Third party processor 900 may include, without limitation, a credit card processing institution, a banking institution, a membership management server, a game server, a social media server, an information management server, and the like. The third party processor 900 may communicate with multiple online service providers, including online service provider 901, online service provider 902, and up to online service provider N.

The third party processor 900 may issue a secure token in exchange for exchange information corresponding to user account information of a user, and map a relationship between the issued secure token, exchange information, online service provider, and/or user account information. Referring to FIG. 9, a secure token 910 is mapped to an online service provider 901. When one or more of the online service provider 901, an online service provider 902, and an online service provider N request to conduct an exchange through the third party processor 900 with the secure token 910, the third party processor 900 may check its information to determine which online service provider is mapped to the secure token 910.

Based on the determination by the third party processor 900, the third party processor 900 may process the exchange request made by the online service provider 901, and deny the request for processing made by the other online service providers. Accordingly, security may be enhanced by limiting exposure of liability in case security token information is stolen or compromised without sacrificing the convenience provided by expedited processing of exchange through storage of the secure token.

Figure 10:
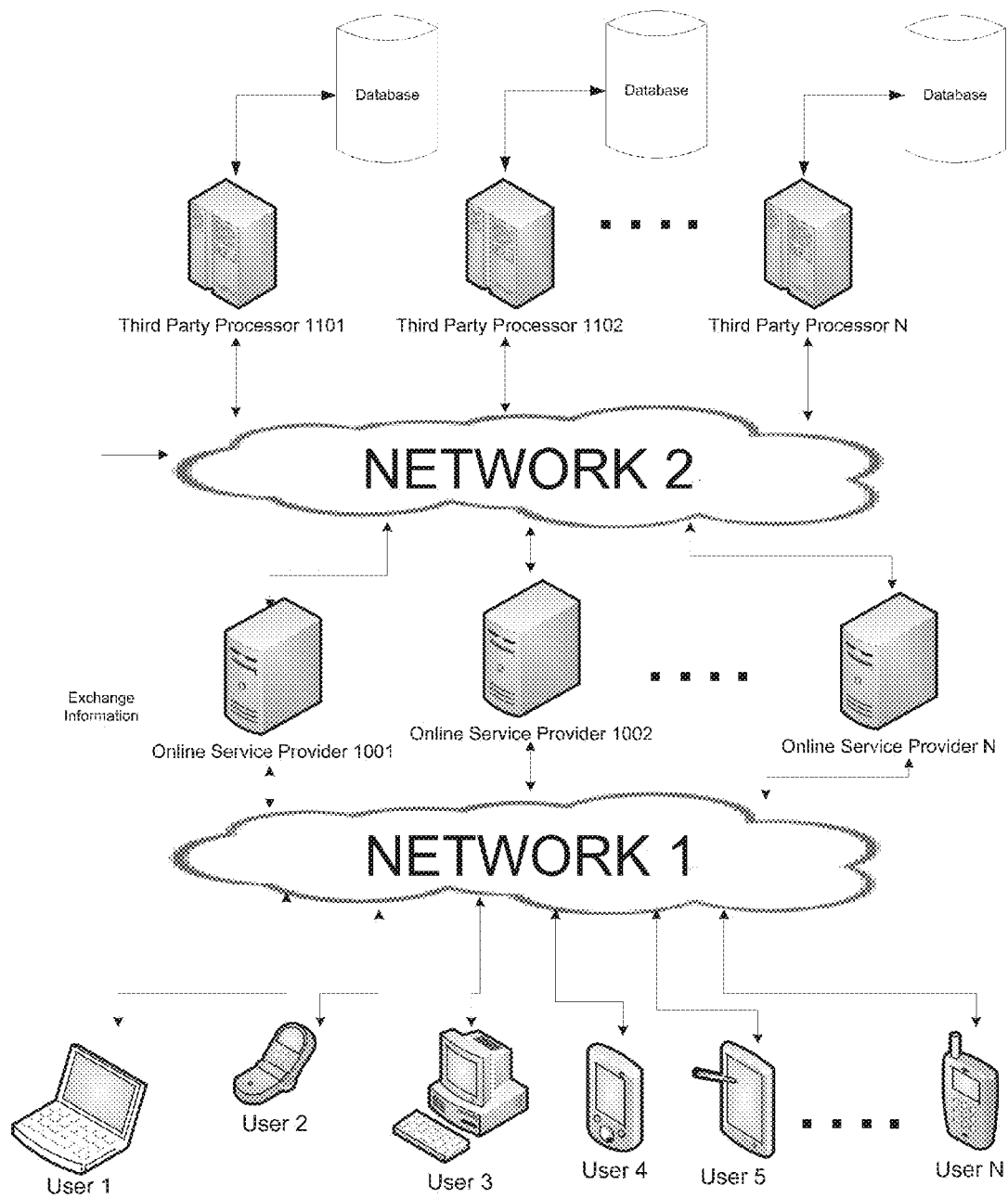
FIG. 10 shows an exemplary system network for facilitating interactions between various parties involved in generating, receiving, and/or using a secure token specific to an online service provider, according to an aspect of the present disclosure.

FIG. 10 shows an exemplary system network for facilitating interactions between various parties involved in generating, receiving, and/or using a secure token specific to an online service provider, according to an aspect of the present disclosure. Users or user devices, including User 1, User 2, User 3, User 4, User 5, and up to User N may communicate with one or more online service providers through Network 1. User devices may include, without limitation, a laptop computer, a mobile phone or a smart phone, a desktop computer, a personal digital assistant, a tablet computer, a smart watch, or any other computing devices that may transmit or receive data. Online service providers may include Online Service Provider 1001, Online Service Provider 1002, and up to Online Service Provider N. Further, the users or user devices may also communicate with one or more third party processors through Network 2. Third party processors may include Third Party Processor 1101, Third Party Processor 1102, and up to Third Party Processor N. The third party processors may store data in its own secure database or at a database serviced by a vendor, such as a cloud database.

Network 1 and/or Network 2 may include a mobile network, wireless network, wired network, a telecommunications network, or any other data network that allows computing devices to exchange data. Although the third party processors are illustrated as communicating with the users or user devices through Network 2, online service providers, and Network 1, aspects of the present disclosure are not limited thereto, such that the third party processors may communicate with the user or user devices through a single network. For example, a user or user device may transmit exchange information directly to the third party processor through a single network.

According to an aspect of the present disclosure, a method of generating an online service provider specific secure token includes, at a token processor, receiving over a network, at a token processor, user account information of a user account for a user registered with an online service provider, receiving over the network, at the token processor, exchange information for an exchange between the user and the online service provider, generating, using a processor of a computer and based on the exchange information, a secure token to be used for the exchange, mapping the secure token to the online service provider. When the secure token is mapped to be specific to the online service provider, the secure token is transmitted to the respective online service provider. The store secure token may be useable only at the mapped servicer provider.

According to an aspect of the present disclosure, the stored secure token is reusable for conducting multiple exchanges.

According to an aspect of the present disclosure, the exchange information is received, such that the exchange information bypasses the online service provider. Accordingly, the online service provider does not store or have access to the exchange information of the user.

According to an aspect of the present disclosure, the exchange information is received from the online service provider.

According to an aspect of the present disclosure, the exchange information is deleted at the online service provider.

According to another aspect of the present disclosure, mapping information that maps a relationship between the secure token and the online service provider is stored at the online service provider.

According to yet another aspect of the present disclosure, mapping information that maps a relationship between the secure token and the user account information is stored at the online service provider.

According to yet another aspect of the present disclosure, the method further includes, receiving, from a requesting online service provider, the secure token, and determining whether the secure token is mapped to the requesting online service provider. Further, if the secure token is determined to be mapped to the requesting online service provider, retrieving exchange information mapped to the secure token, and authorizing the exchange using the exchange information. And, if the secure token is determined to be not mapped to the requesting online service provider, denying the exchange.

According to yet another aspect of the present disclosure, the method further includes, determining whether the secure token is used by a user account mapped to the secure token.

According to yet another aspect of the present disclosure, the method further includes, determining whether an account corresponding to the exchange information mapped to the secure token has sufficient balance to process the exchange.

According to yet another aspect of the present disclosure, the method further includes, if the secure token is determined not to be mapped to the online service provider, notifying the online service provider mapped to the secure token of the denied exchange.

According to yet another aspect of the present disclosure, the method further includes, verifying identification of the user when receiving the exchange information.

According to yet another aspect of the present disclosure, the method further includes, establishing a secure channel with the user for receiving the exchange information.

According to an aspect of the present disclosure, the establishing of the secure channel is initiated by the token processor.

According to an aspect of the present disclosure, among the secure token and the exchange information, the online service provider has access only to the secure token.

According to an aspect of the present disclosure, the secure token is mapped to only one online service provider.

According to an aspect of the present disclosure, the online service provider stores either the exchange information or the secure token, but not both.

According to an aspect of the present disclosure, the exchange information is received only at the token processor among the token processor and the online service provider.

According to an aspect of the present disclosure, a tangible non-transient computer readable storage medium that stores a computer program, the computer program, when executed by a processor, causing a computer apparatus to perform a process including receiving over a network, at a token processor, user account information of a user registered with an online service provider; receiving over the network, at the token processor, exchange information for the user account information; generating, using a processor of a computer, a secure token based on the exchange information; mapping the secure token to the online service provider; and transmitting the secure token over the network for storage at the online service provider, in which the secure token is usable by the user only at the mapped online service provider.

According to an aspect of the present disclosure, a computer apparatus includes a memory that stores instructions, and a processor that executes the instructions. When executed by the processor, the instructions cause the processor to perform the following operations: receiving over a network, at a token processor, user account information of a user registered with an online service provider; receiving over the network, at the token processor, exchange information for the user account information; generating, using a processor of a computer, a secure token based on the exchange information; mapping the secure token to the online service provider; and transmitting the secure token over the network for storage at the online service provider, in which the secure token is usable by the user only at the mapped online service provider.

Accordingly, a system and method for generating a service provider based secure token enables generation of a secure token that is specific to an online service provider, such that the generated secure token can be used only at the online service provider mapped to the secure token. By generating the secure token for storage in lieu of standard exchange information and limiting usage of the generated secure token to a specific online service provider, security may be enhanced in multiple ways to protect both the user and the online service provider. For example, by storing the secure token in lieu of the standard exchange information (e.g., credit card information), exposure to unauthorized charges may be limited to online service providers accepting secure tokens in the event that the secure token is stolen or leaked. Further, by mapping the secure token to a specific online service provider may further increase security by limiting exposure of unauthorized charges only to the online service provider corresponding to the secure token. Accordingly, even if information pertaining to the secure token stored at the online service provider is compromised in response to a hacking attack, mismanagement, theft, or other causes, effected users and/or online service provider may limit liability by restricting usage of the secure token to the corresponding online service provider.

Further, if the information pertaining to the secure token is compromised for one or more reasons, the third party processor may block usage of the compromised secure token, and issue a new uncompromised secure token. The new uncompromised secure token may be mapped to the online service provider and user account that were previously mapped to the compromised secure token. The third party processor may block the usage of the compromised secure token on its own or in response to a request from the effected online service provider or user. However, aspects of the disclosure are not limited thereto, such that the online service provider may also, without limitation, isolate the compromised secure token for security and analysis, remove the compromised secure token from its server(s), and/or notify the third party processor of the compromise. Further, a notification may be generated by the compromised online service provider and/or the third party processor to be transmitted to effected users. Thus, security may be increased and exposure to liability may be decreased to provide a more secure online exchanges.

Although a system and method for generating a service provider based secure token has been described with reference to several exemplary embodiments, it is understood that the words that have been used are words of description and illustration, rather than words of limitation. Changes may be made within the purview of the appended claims, as presently stated and as amended, without departing from the scope and spirit of the system and method for generating a service provider based secure token has been described with reference to particular means, materials and embodiments, the system and method for generating a service provider based secure token is not intended to be limited to the particulars disclosed; rather the system and method for generating a service provider based secure token extends to all functionally equivalent structures, methods, and uses such as are within the scope of the appended claims.

While the computer-readable medium is shown to be a single medium, the term "computer-readable medium"

includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, the tokens described herein represent examples of the state of the art. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of generating an online service provider specific secure token, the method comprising:

receiving over a network, from an online service provider and by a third party server having a processor, user account information of a user account for a user registered with the online service provider and a request to establish a secure channel between a user device and third party server;

establishing the secure channel between the user device and the third party server;

receiving over the secure channel of the network, from the user device and by the third party server, exchange information for an exchange between the user and the online service provider, wherein the exchange information includes at least one of credit card information, checking account information, bitcoin account information, loyalty point information, membership information, gaming account information and security information;

verifying, by the third party server, identification of the user providing the exchange information based on correspondence between the received exchange information and the user account information;

generating, using the processor of the third party server and based on the exchange information, a secure token to be used for the exchange;

mapping, by the third party server, the secure token to the user account information of the user stored at the online service provider, such that the mapped secure token is usable via the user account at the mapped online service provider;

transmitting, by the third party server and to the online service provider, the secure token over the network for storage at the online service provider, wherein the secure token transmitted by the third party server is received by the online service provider and stored therein;

receiving over the network, by the third party server and from a requesting online service provider, the secure token for requesting an exchange using the secure token;

determining, by the third party server, whether the secure token is mapped to the requesting online service provider;

determining, by the third party server, whether the secure token is being used by the user account mapped to the secure token;

if the secure token is determined to be mapped to the requesting online service provider and the user account mapped to the secure token, determining, by the third party server, whether the exchange information mapped to the secure token has a value equal to or greater than a value required to process the exchange, and if the exchange information mapped to the secure token is determined to have the value equal to or greater than the value required to process the exchange, the third party server retrieves exchange information mapped to the secure token, and authorizes the request for the exchange using the retrieved exchange information; and if the secure token is determined not to be mapped to the requesting online service provider, or if the secure token is determined to be mapped to the requesting online service provider and the user account is determined not to be mapped to the secure token, denying, by the third party server, the request for the exchange, and notifying, by the third party server, the online service provider mapped to the secure token of the denied exchange.

2. The method according to claim 1,
wherein the secure token is reusable for conducting multiple exchanges.

3. The method according to claim 1, wherein
the exchange information is received over the network, such that the exchange information bypasses the online service provider.

4. The method according to claim 1, wherein
mapping information that maps a relationship between the secure token and the online service provider is stored at the online service provider.

5. The method according to claim 4, wherein
mapping information that maps a relationship between the secure token and the user account information is stored at the online service provider.

6. The method according to claim 1, wherein the establishing of the secure channel is initiated by the third party server.

7. The method according to claim 1, wherein among the secure token and the exchange information, the online service provider has access only to the secure token.

8. The method according to claim 1, wherein the secure token is mapped to only one online service provider.

9. The method according to claim 1, wherein the online service provider stores either the exchange information or the secure token, but not both.

10. The method according to claim 1, wherein the exchange information is received only at the third party server among the third party server and the online service provider.

11. A tangible non-transitory computer readable storage medium that stores a computer program, the computer program, when executed by a processor, causing a third party server to perform a process comprising:

receiving over a network, from an online service provider and by the third party server having the processor, user account information of a user account for a user registered with the online service provider and a request to establish a secure channel between a user device and third party server;

establishing the secure channel between the user device and the third party server;

receiving over the secure channel of the network, from the user device and by the third party server, exchange information for an exchange between the user and the online service provider, wherein the exchange information includes at least one of credit card information, checking account information, bitcoin account information, loyalty point information, membership information, gaming account information and security information;

verifying, by the third party server, identification of the user providing the exchange information based on correspondence between the received exchange information and the user account information;

generating, using the processor of the third party server and based on the exchange information, a secure token to be used for the exchange;

mapping, by the third party server, the secure token to the user account information of the user stored at the online service provider, such that the mapped secure token is usable via the user account at the mapped online service provider;

transmitting, by the third party server and to the online service provider, the secure token over the network for storage at the online service provider, wherein the secure token transmitted by the third party server is received by the online service provider and stored therein;

receiving over the network, by the third party server and from a requesting online service provider, the secure token for requesting an exchange using the secure token;

determining, by the third party server, whether the secure token is mapped to the requesting online service provider;

determining, by the third party server, whether the secure token is being used by the user account mapped to the secure token;

if the secure token is determined to be mapped to the requesting online service provider and the user account mapped to the secure token, determining, by the third party server, whether the exchange information mapped to the secure token has a value equal to or greater than a value required to process the exchange, and if the exchange information mapped to the secure token is determined to have the value equal to or greater than the value required to process the exchange, the third party server retrieves exchange information mapped to the secure token, and authorizes the request for the exchange using the retrieved exchange information; and if the secure token is determined not to be mapped to the requesting online service provider, or if the secure token is determined to be mapped to the requesting online service provider and the user account is determined not to be mapped to the secure token, denying, by the third party server, the request for the exchange, and notifying, by the third party server, the online service provider mapped to the secure token of the denied exchange.

12. A third party server, comprising:
a memory that stores instructions, and
a processor that executes the instructions, wherein, when executed by the processor, the instructions cause the processor to perform operations comprising:

receiving over a network, from an online service provider and by the third party server having the processor, user account information of a user account for a user registered with the online service provider and a request to establish a secure channel between a user device and third party server;

establishing the secure channel between the user device and the third party server;

receiving over the secure channel of the network, from the user device and by the third party server, exchange information for an exchange between the user and the online service provider, wherein the exchange information includes at least one of credit card information, checking account information, bitcoin account information, loyalty point information, membership information, gaming account information and security information;

verifying, by the third party server, identification of the user providing the exchange information based on correspondence between the received exchange information and the user account information;

generating, using the processor of the third party server and based on the exchange information, a secure token to be used for the exchange;

mapping, by the third party server, the secure token to the user account information of the user stored at the online service provider, such that the mapped secure token is usable via the user account at the mapped online service provider;

transmitting, by the third party server and to the online service provider, the secure token over the network for storage at the online service provider, wherein the secure token transmitted by the third party server is received by the online service provider and stored therein;

receiving over the network, by the third party server and from a requesting online service provider, the secure token for requesting an exchange using the secure token;

determining, by the third party server, whether the secure token is mapped to the requesting online service provider;

determining, by the third party server, whether the secure token is being used by the user account mapped to the secure token;

if the secure token is determined to be mapped to the requesting online service provider and the user account mapped to the secure token, determining, by the third party server, whether the exchange information mapped to the secure token has a value equal to or greater than a value required to process the exchange, and if the exchange information mapped to the secure token is determined to have the value equal to or greater than the value required to process the exchange, the third party server retrieves exchange information mapped to the secure token, and authorizes the request for the exchange using the retrieved exchange information; and if the secure token is determined not to be mapped to the requesting online service provider, or if the secure token is determined to be mapped to the requesting online service provider and the user account is determined not to be mapped to the secure token, denying, by the third party server, the request for the exchange, and notifying, by the third party server, the online service provider mapped to the secure token of the denied exchange.

13. The method according to claim 1, wherein the transmitting of the secure token includes transmitting the secure token directly to the online service provider from the third party server.

* * * * *